(12) United States Patent
Riecke

(10) Patent No.: US 6,419,192 B1
(45) Date of Patent: Jul. 16, 2002

(54) RETAINING ELEMENT AND METHOD OF MOUNTING LINES

(75) Inventor: Ernst-Hermann Riecke, Bad Berleburg (DE)

(73) Assignee: EJOT Kunststofftechnik GmbH & Co. KG, Bad Berleburg (DE)

( * ) Notice: Subject to any disclaimer, the term of this patent is extended or adjusted under 35 U.S.C. 154(b) by 0 days.

(21) Appl. No.: 09/308,735
(22) PCT Filed: Nov. 25, 1997
(86) PCT No.: PCT/EP97/06564
§ 371 (c)(1),
(2), (4) Date: Aug. 12, 1999
(87) PCT Pub. No.: WO98/23873
PCT Pub. Date: Jun. 4, 1998

(30) Foreign Application Priority Data

Nov. 25, 1996 (DE) .......................................... 196 48 775
Aug. 26, 1997 (DE) .......................................... 197 37 159

(51) Int. Cl.[7] ............................ F16B 41/00; F16L 3/237
(52) U.S. Cl. ............................ 248/65; 248/71; 248/68.1
(58) Field of Search ........................ 248/71, 74.1, 74.4, 248/74.5, 65, 68.1

(56) References Cited

U.S. PATENT DOCUMENTS 2,961,210 A * 11/1960 Pfaff et al. ................. 248/74.1
4,588,152 A * 5/1986 Ruehl et al. .................. 248/71
4,903,920 A * 2/1990 Merritt .......................... 248/71
5,090,645 A * 2/1992 Zuercher ...................... 248/71
5,411,228 A * 5/1995 Morawa et al. ............. 248/74.1
5,979,839 A * 11/1999 Horn et al. .................... 248/71
6,010,100 A * 1/2000 Merritt .......................... 248/71

FOREIGN PATENT DOCUMENTS

| DE | 8701553 | 3/1987 |
| DE | 8900523 | 3/1989 |
| DE | 8900755 | 3/1990 |
| GB | 2240807 | 8/1991 |

* cited by examiner

Primary Examiner—Leslie A. Braun
Assistant Examiner—Ingrid Weinhold
(74) Attorney, Agent, or Firm—Wood, Phillips, Katz, Clark & Mortimer

(57) ABSTRACT

The invention relates to a retaining element of plastic having a captive fastening part located therein and to a method of mounting lines on an article. In this case, the retaining element has at least one line receptacle, at least one cavity for the captive accommodation of a fastening part, at least two pivotable tongues in the wall of the cavity, with in each case a retaining member directed into the cavity and intended for accommodating a radially projecting section of the fastening part in a preassembly position, a tool entry opening of the cavity, and a bearing surface, serving as final assembly position, on the bottom of the cavity. The cavity is preferably formed by three finger-like catch hooks.

18 Claims, 3 Drawing Sheets

RETAINING ELEMENT AND METHOD OF MOUNTING LINES

The invention relates to a retaining element of plastic having a fastening part located therein and to a method of mounting lines on articles.

The mounting of lines, such as pipes and cables, on a foundation by means of clips is expensive and requires complicated working steps. Often, to fasten lines and the like, first of all threaded bolts or the like are attached to an article. A fitter in each case puts a plastic clip onto a threaded bolt. The lines and a mating part are then put onto the clip. Further rationalization of these operations is problematic, since the sequence of operations has to be maintained. In addition, a multiplicity of parts have to be manipulated.

An aim of the present invention is to provide a retaining element of plastic and a method for simplified mounting of lines, such as, for example, electric cables, pipes and the like.

This aim is achieved with a retaining element and a method as defined in the claims, the subclaims representing expedient developments.

Accordingly, a retaining element of plastic having at least one line receptacle and a cavity for the captive accommodation of a fastening part is provided. The fastening is no longer effected on retaining devices attached beforehand, such as threaded bolts for example. The fastening part is preferably made of metal and in particular is preferably designed as a screw.

The hole- and thread-forming screw presented in DE 39 09 725 C1 for screwing into sheet metal of a thickness up to about 1 mm is especially suitable as fastening part for fastening the retaining element according to the invention. Such a screw has a head having a tool receptacle, a threaded shank and an adjoining cylindrical part which is of a diameter lying below the effective diameter of the threaded shank and merges into a tapering hole-forming part. In this case, the threaded shank merges into the cylindrical part via a taper extending over about four thread turns. The hole-forming part ends in a crowned friction surface which corresponds to a radius of about 0.5 mm. Especially firm seating can be achieved with such a hole- and thread-forming screw, the accumulation of metal chips, which could fall into the hole produced, being avoided at the same time.

The fastening part is in particular preferably enclosed in the radial direction over its entire length by the retaining element and therefore does not project axially beyond the latter. Risk of injury due to a projecting point of the fastening part is thus avoided. The position of the preassembled fastening part can no longer be changed from outside, for example during transport. Since it is thus not possible for the front end (point) of the fastening part to project, plane-parallel bearing of the retaining element against an article can be achieved without the retaining element being distorted during assembly. This is especially important when a plurality of fastening parts which could otherwise project from the retaining element with their points are provided for attaching the retaining element to the article.

In a modification of the invention, the cavity is laterally open. In particular, at least two, preferably at least three, and preferably three openings are provided. These openings may be designed like windows. These openings are preferably designed in such a way that they run up to the free margin of the cavity. In this way, the cavity is defined by finger-like projections, there being at least two, but preferably three of such finger-like projections. These finger-like projections are preferably of symmetrical design and arranged around the cavity.

In this modification, the invention thus relates to a retaining element of plastic in which the cavity is formed by a wall provided with openings.

In this case, the wall provided with openings is preferably formed from at least two, preferably at least three, and in particular preferably three finger-like projections. For effective retention of the fastening part, the finger-like projections, in the region facing the cavity, are provided with an extension having a groove-like section for retaining the fastening part.

The retaining element is preferably designed in such a way that the finger-like projections are approximately as long as the fastening part.

This modification of the invention therefore represents a retaining element of plastic, in particular one as described above for mounting lines on an article, which retaining element has:

a. at least one line receptacle, b. at least one location region formed from at least two finger-like projections and intended for the captive accommodation of a fastening part, c. a retaining location device located in the location region and intended for accommodating and retaining the fastening part in a preassembly position, d. a tool entry opening of the location region on that side of the retaining element which is remote from the article, e. a bearing surface, serving as final assembly position, on the bottom of the location region for a head of the fastening part.

The fastening of the retaining element according to the invention does not require the same precision as the placing of a clip at a point which is exactly predetermined, for example by an attached threaded bolt. Simple assembly is possible on account of the fastening part captively preassembled in the retaining element. No mating part has to be put onto a first clip. It is merely necessary to slip the retaining element onto one or more lines, to place this system in position and to anchor the fastening part to the relevant article. Apart from the lines to be fastened and having retaining elements, no further part has to be moved. On account of the simple working steps and the reduced requirement for precision during assembly, the system is readily suitable not only for manual assembly but also for semi-automatic or fully automatic assembly. The preassembled system, consisting of the lines with retaining elements attached thereto, can be delivered from suppliers to the manufacturer so as to suit a corresponding article, e.g. lines fitted with retaining elements for the cooling unit of a refrigerator. At the manufacturer's, the system need only be placed in position on the article and fastened or screwed thereto.

Further advantages, features and possible uses of the present invention follow from the description below of an exemplary embodiment in combination with the drawings, in which preferred embodiments and features of the invention are shown and:

Figure 1:
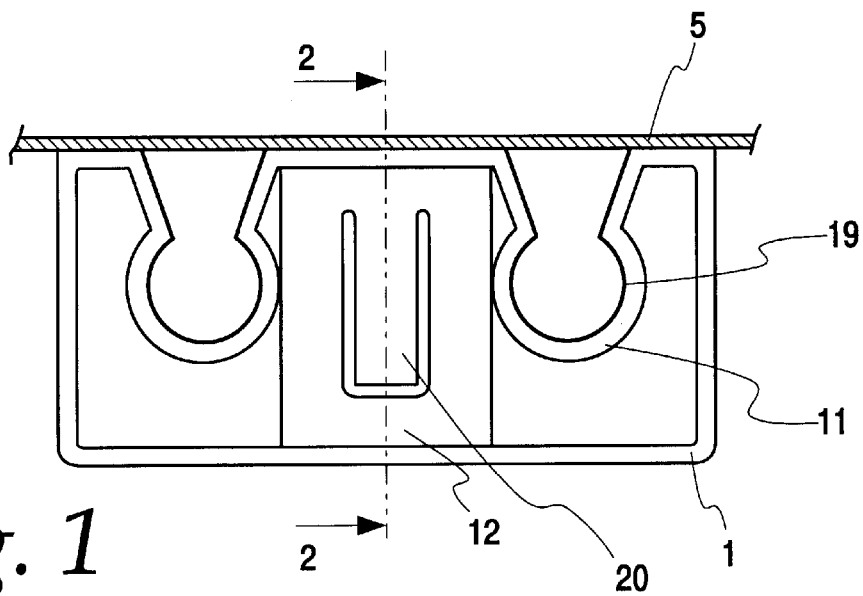
FIG. 1 shows a retaining element bearing against a foundation.

A retaining element 1 bearing on a sheet-metal foundation or article 5 is shown in FIG. 1. The retaining element has 2 line receptacles 11, which are provided with an elastic coating, for example a thermoplastic elastomer, rubber, silicone or the like, in the inner region. Such an elastic coating absorbs vibrations which otherwise would be transmitted by a line, in particular from a pump operation, to the article. A central cavity 12 of the retaining element is provided for accommodating a fastening part. A retaining location device 20 formed axially in the wall of the cavity 12 with respect to the fastening part to be inserted serves to accommodate the fastening part in a preassembly position. The retaining location device is shaped as a tongue.

Figure 2:
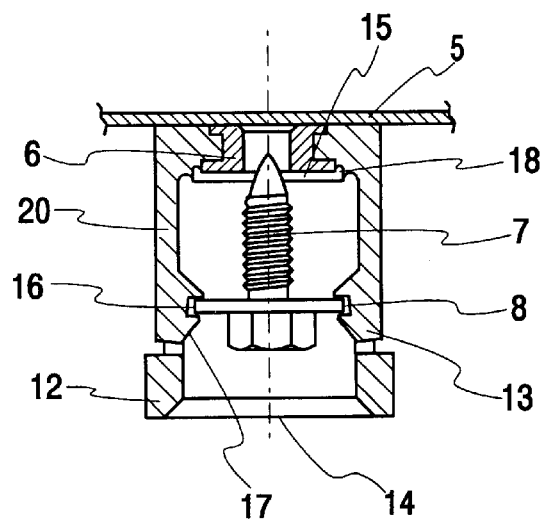
FIG. 2 shows a section through the cavity of the retaining element of FIG. 1.

FIG. 2 shows a section through the cavity 12. A fastening part 7 designed as a screw is held in a preassembly position by tongues 20. To this end, a pressure washer extending radially beyond the head from the shank of the screw 7 is snapped into a groove 16 of the retaining members 13 of the tongues 20. Due to the one-piece design of a tongue 20 with the wall of the cavity 12, a prestress which is adequate for the captive retention of the fastening part 7 is applied. The fastening screw is not removed from its preassembly position even by vibrations, as occur during transport.

The retaining element 1 is configured in such a way that the fastening part 7 is enclosed axially by the retaining element. Therefore neither point nor head projects from the retaining element or the cavity 12.

The tool entry opening 14 is bevelled, so that it widens outwards or the wall of the cavity 12 tapers. In this way, a tool to be inserted into the tool entry opening 14 is centred. This is especially helpful when a tool is to be inserted automatically into the cavity 12 of the retaining element.

That end section 17 of the tongue 20 which faces the tool entry opening 14 is designed as a projection directed into the cavity in order to accommodate the fastening part in a preassembly position and tapers in the direction of the tool entry opening 14 on its side facing the interior of the cavity 12. This end section 17, designed as an inclined plane, enables a tool penetrating into the cavity 12 or the fastening part 7 itself to expand the hook-like tongues 20 in opposition to their prestress and put the fastening part into its preassembly position and subsequently into the separate final assembly position from its preassembly position.

Figure 3:
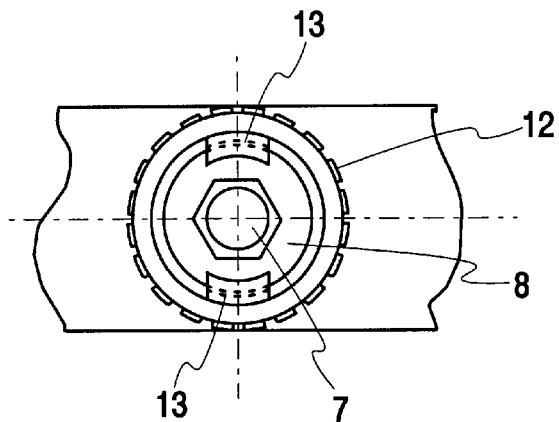
FIG. 3 shows a plan view of the cavity of the retaining element.

FIG. 3 shows a plan view of the cavity 12. It can be seen that the cavity 12 accommodates two retaining members 13 and consequently two tongues 20. The retaining members 13 are designed as inwardly directed, snap-hook-like projections having an encircling groove 16 on their inside.

Figure 4:
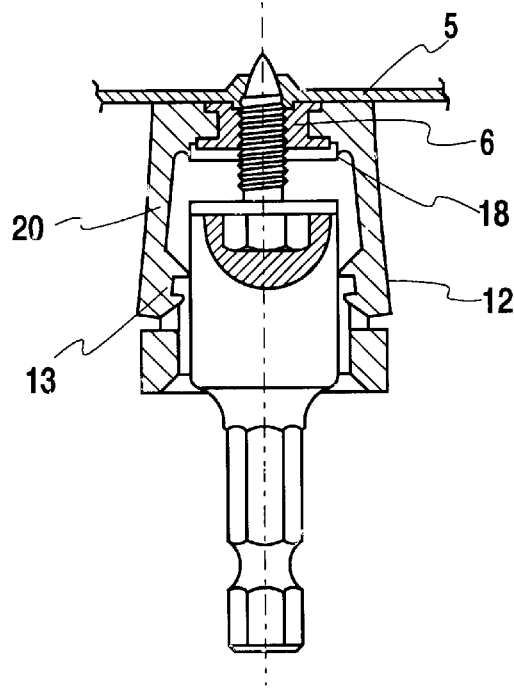
FIG. 4 shows a section through the cavity of the retaining element when the fastening screw is being screwed into place.

FIG. 4 shows a driving tool coming into action in the cavity 12. When penetrating into the cavity 12, the tool, which is designed as a socket spanner, acts on the tapering end sections 17 of the retaining members 13 and spreads the tongues 20 apart upon further penetration, takes hold of the head of the screw 7 in the preassembly position and pushes the screw in the direction of the final assembly position for screwing into the foundation 5. In the preassembly position, the screw is located with its front end in a metal bush 6. The metal bush ensures that a sufficiently large prestress can be applied with the fastening part 7 for very good service life.

The fastening screw 7 has a conical hole-forming part. The cone has symmetrically arranged flats, as described in DE 39 09 725 C1. This ensures that the point or the front section of the screw 7, in a quick and reliable manner, creates a nozzle-shaped opening in the sheet-metal foundation, in which a thread is formed by the adjoining threaded section. Preliminary perforation in an article or a preassembled fastening member, such as, for example, an attached threaded bolt or the like, can be dispensed with.

Figure 5:
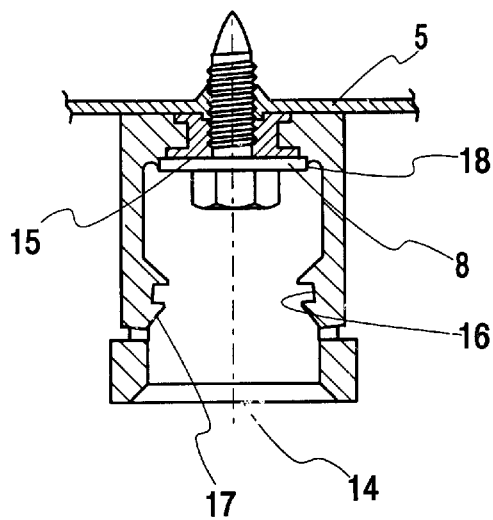
FIG. 5 shows a section through the cavity of the retaining element fastened to the foundation.

FIG. 5 shows the screw 7 in its final assembly position. It rests with its head on the bearing surface 15 formed by the metal bush 6. In this case, the pressure washer 8 of the head, which projects radially relative to the tool application section of the head, permits an especially favourable distribution of the forces over a larger area. At the same time, the pressure washer 8 can serve not only to retain the screw in the preassembly position but also as a stop for guiding the screw by a tool.

When being screwed into place, the screw head deforms a sealing lip 18, which surrounds the screw head in a sealing manner. Ingress of moisture into the sheet-metal foundation is thus reliably avoided.

The insertion of the fastening part 7 into the foundation 5 is not disturbed by lines, since the cavity 12, which accommodates the fastening part 7, is designed to be separate from one or more line receptacles of the retaining element 1. Line receptacle 11 and cavity 12 are arranged to be offset perpendicularly to the direction of fastening. A line is clipped, snapped or clamped into a line receptacle in a captive manner.

Figure 6:
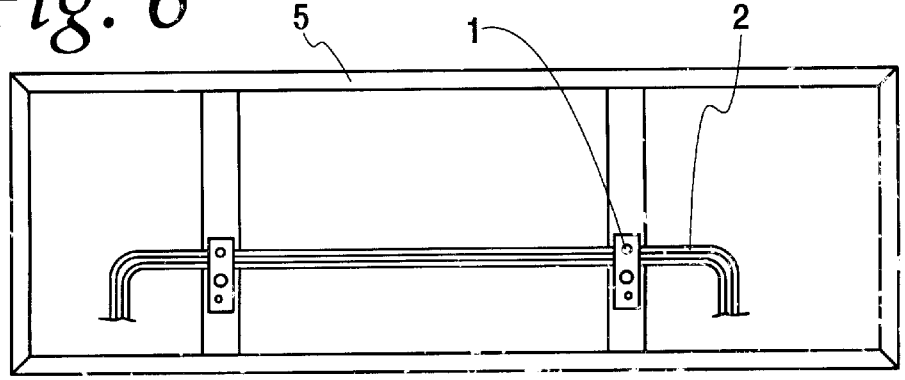
FIG. 6 shows pipelines attached to an article.

FIG. 6 shows pipelines 2 which are anchored on a sheet-metal foundation 5 by the retaining element 1. The retaining element is fastened to the foundation by means of a hole- and thread-forming screw.

Figure 7:
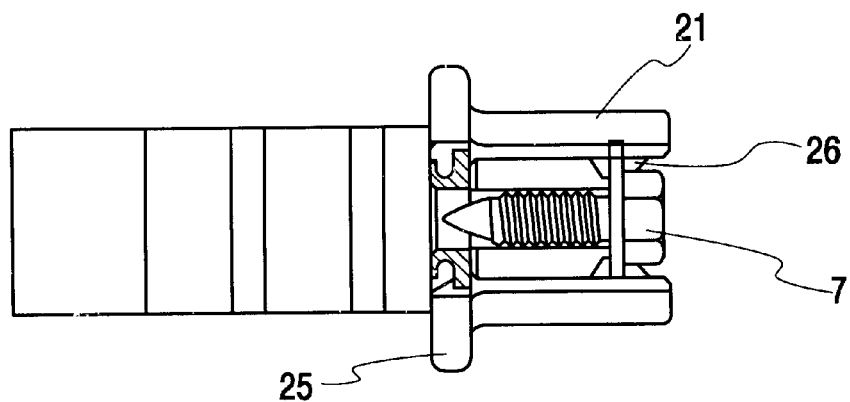
FIGS. 7 and 8 show a modified embodiment of the retaining element according to the invention.
Figure 8:
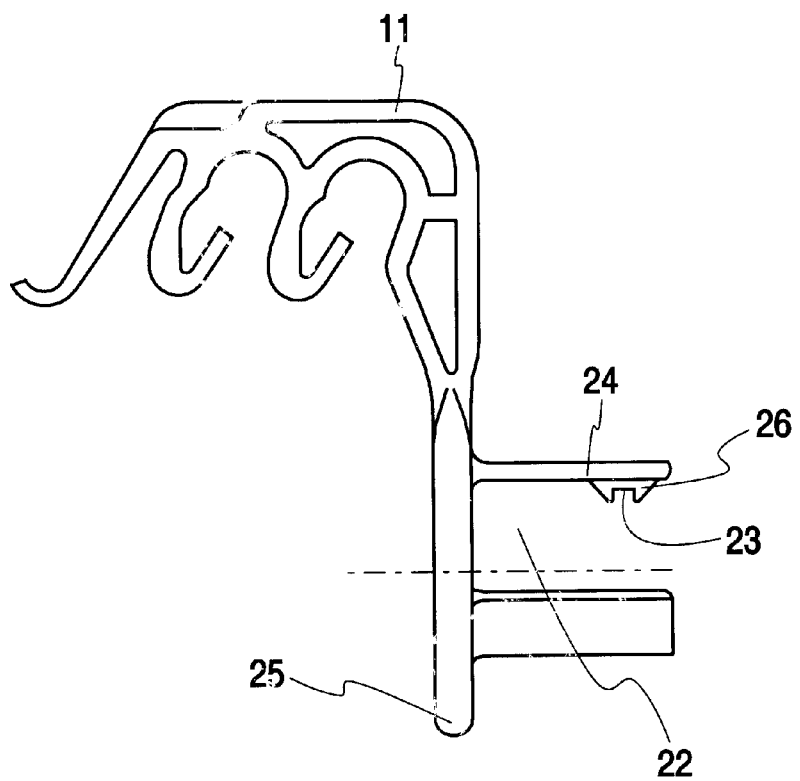

Three finger-like projections or catch hooks 21 are provided in the modification, shown in FIGS. 7 and 8, of the retaining element according to the invention. These catch hooks 21 project axially from a base ring 25, which also guides the point of the screw 7. The catch hooks have extensions 24 on their inside and in the region of the free end, these extensions 24 having recesses 23, in which, for example, an annular region of a screw head is retained. For the captive retention of a fastening part, e.g. a screw 7, the finger-like projections or catch hooks need only be bent slightly outwards. This operation may be automated in a simple manner. The extensions 24 are preferably provided with a bevel 26, which is directed inwards and facilitates the insertion of the fastening part 7.

The retaining element of this modification is also preferably injection-moulded in one piece from plastic.

List of Reference Numerals

1 Retaining element
2 Pipeline
3 Foundation
4 Metal bush
7 Fastening part
8 Pressure washer of the fastening part
11 Line receptacle of the retaining element
12 Cavity of the retaining element
13 Retaining member for the preassembly of the fastening part
14 Tool entry opening
15 Bearing surface for the final assembly of the fastening part
16 Groove
17 End section of the retaining member
18 Sealing lip
19 Elastic coating in the line receptacle
20 Pivotable tongue 21 Finger-like catch hooks
22 Openings
23 Groove-like section
24 Extension
25 Base ring
26 Bevel

What is claimed is:

1. Retaining element of plastic for mounting lines on an article and adapted for use with a fastening part by which the retaining element may be secured to an article which retaining element has:
   a. at least one line receptacle (11);
   b. at least one cavity (12) for the captive accommodation of a fastening part (7);
   c. a retaining location device (13, 20) located in the cavity and intended for accommodating and retaining a fastening part (7) in a preassembly position in such a way that a fastening part (7) does not project beyond the retaining element in the axial direction;
   d. a tool entry opening (14) of the cavity (12) on that side of the retaining element which is remote from the article;
   e. a bearing surface (15), serving as final assembly position, on the bottom of the cavity (12) for a head of a fastening part; and
   f. characterized in that, when a fastening part (7) is pushed axially into its pre-assembly position, the retaining location device (20) exerts a radial prestress, which is at least partly relieved in the pre-assembly position.

2. Retaining element according to claim 1, characterized in that the retaining location device has at least 2 pivotable tongues (20) in the wall of the cavity (12), with in each case a retaining member (13) directed into the cavity and intended for accommodating a radially projecting section (8) of a fastening part (7) in a preassembly position.

3. Retaining element according to claim 2, characterized in that the retaining member (13) is designed as a projection directed into the cavity.

4. Retaining element of plastic for mounting lines on an article and adapted for use with a fastening part by which the retaining element may be secured to an article which retaining element has:
   a. at least one line receptacle (11);
   b. at least one cavity (12) for the captive accommodation of a fastening part (7);
   c. a retaining location device (13,20) located in the cavity and intended for accommodating and retaining a fastening part (7) in a preassembly position in such a way that a fastening part (7) does not project beyond the retaining element in the axial direction, characterized in that the retaining location device (13,20) has at least two pivotal tongues (20) in the wall of the cavity (12), with in each case a retaining member (13) directed into the cavity and intended for accommodating a radially projecting section (8) of a fastening part (7) in a preassembly position;
   d. a tool entry opening (14) of the cavity (12) on that side of the retaining element which is remote from the article;
   e. a bearing surface (15), serving as a final assembly position, on the bottom the cavity (12) for a head of a fastening part;
   f. the retaining member (13) being designed as a projection directed into the cavity (12); and
   g. further characterized in that a groove (16) running radially relative to a fastening part (7) is formed on that side of the retaining member (13) which is directed into the cavity (12).

5. Retaining element according to claim 3, characterized in that that end section (17) of the retaining member (13) which faces the tool entry opening (14) tapers in the direction of the tool entry opening on its side directed into the interior of the cavity (12).

6. Retaining element according to claim 3, characterized in that the tool entry opening (14) widens in the direction of the side remote from the bearing surface (15).

7. Retaining element according to claim 3, characterized by a metal bush (6) in the bottom of the cavity (12), which metal bush (6) is intended for bearing on the article (5).

8. Retaining element according to claim 1, characterized by a radial sealing lip (18), which is in one piece with the retaining element (1) and encircles the bearing surface (15) for a fastening part (7) in such a way that the head of a fastening part is surrounded in a sealing manner after the final assembly.

9. Retaining element of plastic for mounting lines on an article and adapted for use with a fastening part by which the retaining element may be secured to an article which retaining element has:
   a. at least one line receptacle (11);
   b. at least one cavity (12) for the captive accommodation of a fastening part (7);
   c. a retaining location device (13, 20) located in the cavity and intended for accommodating and retaining a fastening part (7) in a preassembly position in such a way that a fastening part (7) does not project beyond the retaining element in the axial direction;
   d. a tool entry opening (14) of the cavity (12) on that side of the retaining element which is remote from the article;
   e. a bearing surface (15), serving as final assembly position, on the bottom of the cavity (12) for a head of a fastening part; and
   f. a radial sealing lip (18), which is in one piece with the retaining element (1) and encircles the bearing surface (15) for a fastening part (7) in such a way that the head of a fastening part is surrounded in a sealing manner after the final assembly, the sealing lip (18), starting from a base at the bottom of the cavity (12), tapers in the direction of the tool entry opening (14), at least a base of the sealing lip projecting under the head of a fastening part (7).

10. Retaining element according to claim 1, characterized in that the line receptacle (11) is designed as a clamp for the captive attachment of the retaining element (1) to a line.

11. Retaining element according to claim 1, characterized in that the line receptacle (11) is lined with an elastic material (19).

12. Retaining element according to claim 3, further including a fastening part and characterized in that the fastening part (7) is designed as a hole- and thread-forming screw for screwing into the sheet metal, having a head, a threaded shank and a tapering hole-forming part.

13. Retaining element according to claim 3, characterized in that a fastening part (7) is fully enclosed axially by the retaining element (1) in its preassembly position.

14. Retaining element of plastic according to claim 3, characterized in that the cavity (12) is formed by a wall provided with openings (22).

15. Retaining element of plastic according to claim 14, characterized in that the wall provided with openings (22) is formed from a plurality of finger-like projections (21).

16. Retaining element of plastic for mounting lines on an article and adapted for use with a fastening part by which the retaining element may be secured to an article which retaining element has:

a. at least one line receptacle (11);
b. at least one cavity (12) for the captive accommodation of a fastening part (7);
c. a retaining location device (13, 20) located in the cavity and intended for accommodating and retaining a fastening part (7) in a preassembly position in such a way that the fastening part (7) does not project beyond the retaining element in the axial direction;
d. a tool entry opening (14) of the cavity (12) on that side of the retaining element which is remote from the article;
e. a bearing surface (15), serving as final assembly position, on the bottom of the cavity (12) for a head of [the] a fastening part; and
f. a cavity (12) being formed by a wall provided with openings, the openings (22) being formed from a plurality of finger-like projections (21), the finger-like projections (21), in the region facing the cavity having an extension (24) provided with a groove-like section (23) for retaining a fastening part (7).

17. Retaining element of plastic of mounting lines on an article and adapted for use with a fastening part by which the retaining element may be secured to an article which retaining element has:

a. at least one line receptacle (11);
b. at least one cavity (12) for the captive accommodation of a fastening part (7);
c. a retaining location device (13,20) located in the cavity and intended for accommodating and retaining a fastening part (7) does not project beyond the retaining element in the axial direction;
d. a tool entry opening (14) of the cavity (12) on that side of the retaining element which is remote from the article;
e. a bearing surface (15), serving as final assembly position, on the bottom of the cavity (12) for a head of a fastening part;
f. characterized in that the cavity (12) is formed by a wall providing with openings (22) which in turn is formed from a plurality of finger-like projections (21); and
g. further including a fastening part in said cavity and characterized in that the finger-like projections (21) are approximately as long as the fastening part (7).

18. A plastic, line mounting retaining element for mounting lines on another article, comprising:

a plastic retaining element body;
at least one line receiving receptacle in said body for receiving a line to be mounted on another article;
at least one fastening part cavity in said body and of a size to wholly receive a fastening part;
a fastening part in said cavity, said fastening part including an enlarged head and a narrower shank depending therefrom, and being entirely within said cavity and movable relative to said body such that said shank may extend from said body to secure said body to another article;
a fastening part retaining structure within said cavity resiliently engaging said head to releasably hold said retaining part at a predetermined position within said cavity;
a tool entry opening to said cavity adjacent said head to allow said head to be engaged by a tool; and
a bearing surface in said cavity oppositely of said tool entry opening and positioned to be abutted by said head when said shank is fully extended from said body.

* * * * *